(12) United States Patent
Waldeck et al.

(10) Patent No.: US 6,334,642 B1
(45) Date of Patent: Jan. 1, 2002

(54) COLD CONNECTION

(75) Inventors: Klaus-Dieter Waldeck, Geroldswil; Samuel Streiff, Windisch, both of (CH)

(73) Assignee: Alusuisse Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/679,998

(22) Filed: Oct. 5, 2000

(30) Foreign Application Priority Data

Oct. 5, 1999 (EP) .............................. 99810905

(51) Int. Cl.⁷ .............................................. B62D 27/00
(52) U.S. Cl. .................... 296/29; 296/187; 296/203.03; 296/203.01; 403/174; 403/217
(58) Field of Search ............... 296/29, 187, 203.03, 296/203.01; 403/174, 217, 262

(56) References Cited

U.S. PATENT DOCUMENTS

| | | | | |
|---|---|---|---|---|
| 3,981,107 A | * | 9/1976 | Schubach | 296/29 |
| 4,662,299 A | * | 5/1987 | Eder et al. | 114/84 |
| 4,741,135 A | * | 5/1988 | Baena | 403/262 |
| 4,986,596 A | * | 1/1991 | Gohier | 296/203.01 |
| 4,991,897 A | * | 2/1991 | Karapetian | 296/29 |
| 5,041,318 A | * | 8/1991 | Hulls | 296/181 |
| 5,403,063 A | * | 4/1995 | Sjostedt et al. | 296/187 |
| 5,553,906 A | * | 9/1996 | Kunz | 296/29 |
| 5,588,693 A | * | 12/1996 | Higginson et al. | 296/29 |
| 5,741,042 A | * | 4/1998 | Livingston | 296/29 |
| 6,059,482 A | * | 5/2000 | Beauvoir | 403/262 |
| 6,102,605 A | * | 8/2000 | Emmons | 403/217 |

FOREIGN PATENT DOCUMENTS

| | | |
|---|---|---|
| DE | 37 40 401 A1 | 6/1989 |
| EP | 331 865 | 9/1989 |
| EP | 0541485 * | 10/1992 |
| EP | 755 847 A1 | 1/1997 |

\* cited by examiner

*Primary Examiner*—Joseph D. Pape
*Assistant Examiner*—Kiran B. Patel
(74) *Attorney, Agent, or Firm*—Cohen, Pontani, Lieberman & Pavane

(57) ABSTRACT

A linear cold connection with connecting places contains a first and a second structural component to join first and second construction elements of a frame for road or rail bound vehicles. First construction elements are attached to the first structural component and second construction elements are attached to the second structural component. The first and second structural components are joined together via a pair of first and second joint faces. The joint faces form a length of arc of a circular cylinder with a common circular-cylinder axis. The first structural element is joined to the second structural element via a bolt-type connection penetrating openings in the first and second joint faces. The diameters of the openings transverse to the circular-cylinder axis are larger than the diameters of the bolts where they penetrate the openings with the result that, when the bolt-type connection is loose, both structural components can be displaced with respect to each other by relative movement of the first and second joint faces transverse to the circular-cylinder axis and with that accommodate tolerances.

14 Claims, 3 Drawing Sheets

COLD CONNECTION

BACKGROUND OF THE INVENTION

1. Field of the Invention

The present invention relates to a linear cold connection, in particular for road or rail bound vehicles, between a first and second structural component in which the first and second structural component abut along a pair of parallel first and second joint faces. The first and second structural components are fixed together via bolt-type connections which penetrate the joint faces and have bolt heads.

2. Discussion of the Prior Art

Vehicle superstructures of known type of construction normally contain a structural frame which lies flush with its outer contour, and onto which e.g. cladding elements, the glazing of the window regions and the like are attached. The frame normally contains a plurality of different sections that are joined to modules e.g. via warm or cold connections.

A structural frame normally contains, for example structural components running in the longitudinal direction of the vehicle, in particular longitudinal sections such as floor or roof struts which are joined via linear type cold connections to other components, in particular longitudinal sections such as wall or roof connecting sections.

Longitudinal sections running in the longitudinal direction of the vehicle connect e.g. wall elements to floor or roof elements.

The relatively large production tolerances of the individual structural components represent a serious problem in the production of vehicle bodies. Also, the known linear type cold connections permit only small tolerances in the components. This means that the individual components of a structural frame have to be manufactured with the corresponding precision, or the components to be joined together have to be adapted to each other by expensive reworking.

Known, for example, is a linear type of cold connection in which a first and second longitudinal section, with parallel longitudinal section axes, lie against each other along joining faces and are joined to each other by bolted connections that penetrate the joining faces. This solution has the disadvantage that the parts cannot be adjusted to accommodate tolerances.

EP 0 755 847 describes a structural joint featuring at least two sections that are joined to each other along a common area of contact, i.e. interface, whereby the interface exhibits a curvature of constant radius. The joint is made via rivets which penetrate the interface. The joint can be adjusted by rotating a section. A disadvantage of the described solution, however, is that only after the sections have been adjusted can the holes be made for the subsequent riveting. For that reason the sections cannot be readily re-adjusted without the expense of replacing the sections.

SUMMARY OF THE INVENTION

The object of the present invention is a cost-favourable linear type of cold connection which permits large tolerances in the individual structural components without having to perform extensive reworking.

That objective is achieved by way of the invention in that the joint faces and a contact face that faces the heads of the bolts form an arc of a circular cylinder with common circular-cylinder axis. The joint faces and contact face are an integral part of the structural components, and both structural components can be shifted relative and transverse to the circular-cylinder axis, when the bolted connection is loose.

The first or second structural component with the appropriate joining and, if desired, contact face is manufactured in one piece i.e. without subsequently fitting individual parts to it.

The structural components are usefully longitudinal sections, advantageously single or multi-chamber hollow sections. They preferably exhibit parallel longitudinal axes. The joining faces with corresponding circular-cylinder axis preferably run parallel to the longitudinal axes of the sections.

The structural components may preferably be extruded sections. Components with the present type of advantageous cross-section can be realised in a simple and cost favourable manner in the form of extruded sections. Particularly suitable are extruded sections of aluminium and its alloys. The first or the second structural component or the first and the second structural component may be an extruded section.

The structural components may also be of a ferrous metal such as iron, tin plated or zinc coated iron, steel or alloys of steel, a non-ferrous metal such as e.g. brass or copper, or magnesium and its alloys as well as aluminium and its alloys. The structural components may also be of reinforced plastics, in particular fibre-reinforced plastics or in combination with the above mentioned metals e.g. a metal-plastic composite.

The first and second structural component are usefully joined to each other by means of one or more bolt-type connections passing through openings in the first and second joint faces.

The diameter of the openings transverse to the circular-cylinder axis of the first joint face and advantageously of the first and second joint faces are usefully larger than the diameter of the bolt at the lengths penetrating the openings.

Usefully there are one or more washer elements situated between the areas making contact and the heads of the bolts forming the bolt-type connection. The washer element on the side facing the contact face is circular-cylindrical in shape and made to match the contact surface exactly. The washer element features one or more holes to accommodate the bolts. The washer element may be a single part with one hole for a single bolt connection or a strip-shaped section running parallel to the circular-cylinder axis i.e. a washer section with a plurality of holes for a plurality of bolt-type connections. The washer section may be an extruded section of aluminium or its alloys featuring these through-holes.

The openings in the first joint face may e.g. be ducts, holes, longitudinal or slit-shaped openings, whereby the longitudinal or slit-shaped openings usefully run parallel to the circular-cylinder axis, in the longitudinal direction of the first joint face. The longitudinal or slit-shaped openings may extend over the whole length of the joint face or over parts thereof.

In a preferred embodiment of the invention one of the joint faces, usefully the second such face, features an opening in the form of a longitudinal groove-shaped opening. The longitudinal groove-shaped opening is usefully part of an undercut longitudinal groove situated behind the joint face and running parallel to the circular-cylinder axis. The undercut groove serves to accommodate inserts with internal threads such as turning or clamping plates, inserts or insert sections, whereby the insert section may be a strip-shaped section running parallel to the circular-cylinder axis, in particular an extruded section of aluminium or its alloys featuring a plurality of threaded holes into which bolts can be screwed. By displacing the first component with loose bolt connection along the opening in the longitudinal channel it is possible to accommodate tolerances in the axial direction.

The bolts of the bolt-type connection usefully penetrate the openings in the first joint face and the longitudinal groove-type opening in the second joint face, and are screwed into the internal threads in the insert or inserts.

The clamping plates are usefully parallelogram-shaped plate-type elements with an internal thread. On turning the bolt in the internal thread in the clamping plate, the clamping plates are turned such that their short parallel sides are anchored to the long sides of the undercut groove. The anchoring may be improved by making the side that is forced against the long side of the undercut groove concave in shape, thus providing a biting action.

The joint face lying opposite the longitudinal groove, i.e. the first joint face, usefully exhibits projections which are situated on both sides of the openings and the projections having each an outer projection basis projecting out away from the openings. The projections run parallel to the circular-cylinder axis and project into the longitudinal groove-shaped opening.

The distance between the outer projection bases is usefully smaller than the width of the longitudinal groove-shaped opening, this in such a way that, when the bolt-type connection is loose, by sliding the first and second joint faces relative to each other, the first structural component can be displaced by a relative movement in a direction transverse to the axis until the outer extremities make contact with the facing wall of the longitudinal opening.

The projections may be continuous i.e. extend the whole length of the joint faces or they may be interrupted projections. The projections may e.g. be bolt-shaped, cylindrical or rectangular or bead-shaped. These serve to delimit a maximum permissible relative movement of the structural component transverse to the circular-cylindrical axis and guide the first structural component into the longitudinal groove-shaped opening in the second structural component.

In a preferred embodiment of the invention the projections are first and second bulge-like beads with outer bead bases, situated on both sides of the openings on the first joint face of the first structural component, running in the longitudinal direction of the joint face and parallel to the circular-cylinder axis and projecting into the longitudinal groove-shaped opening. Provided between the outer bead bases and the facing wall of the longitudinal groove-shaped opening in the second joint face is a distance in the form of a free arc length which, when the bolt-type connection is loose, enables the first joint face to be displaced in a clockwise or anti-clockwise direction by sliding it on the second joint face by rotating it about the circular-cylinder axis by an amount equal to the free arc length.

As a result of the above mentioned relative movement of both structural components, connecting points on the components can be adjusted to accommodate the construction elements to be attached there. After adjusting the components, it is then possible to make an immoveable connection by fixing the attachment means i.e. by tightening the bolts.

In one embodiment instead of a longitudinal groove-shaped opening and undercut groove, it is also possible to provide threaded holes in the second structural component to accept the bolts. Further, the above mentioned projections may likewise be arranged a specified distance from a given seating surface, farther from the bolt connection at the outer edge of the contact faces of the joint faces.

In cross-section the first and second joint faces usefully enclose a segment of a circle with an angle of 30 to 180°, advantageously 40 to 90°, in particular 45 to 55°, with reference to the full circle of 360°.

The radius and position of the circular-cylinder axis of the circular-cylinder described by the joint faces depend essentially on the amount of relative movement desired between the first and second structural components at the relevant displacement points.

The relevant displacement points on the structural components are in particular the connecting points where offset-free joints have to be made.

The above mentioned circular-cylinder or circular-cylinder face is in cross-section e.g. dimensioned such that the desired direction of displacement of a relevant displacement point in the structural component is essentially at a right angle to the straight line joining the middle point of the circle of the circular-cylinder cross-section and the relevant displacement point.

Furthermore, the direct distance between the relevant displacement point in the structural component and the middle point of the circle of the circular-cylinder cross-section determines the extent of displacement at the relevant displacement point for a relative displacement about a given angle.

The specific dimensioning and positioning of the circular-cylinder face in the structural components permits therefore the direction and extent of displacement at the relevant displacement points to be selected in both components. Further, different relevant displacement points in the components may exhibit different directions of displacement for a given relative displacement of the components.

The connecting points on the structural components may be adhesive bonding faces, joint faces, struts, flanges, projections, contact faces, grooves, undercut grooves, holes, undercut coupling ends and the like. The connection between the structural components and further components on the connecting points may be made using cold connections such as rivets, bolts, adhesives, clamping and the like or combinations thereof.

In a further embodiment of the invention the diameters of the openings in the first joint face parallel to the circular-cylinder axis are larger than the diameter of the bolts at that part penetrating the openings. In an advantageous version the openings in the first joint face are slit-shaped openings running in lengths parallel to the circular-cylinder axis in the longitudinal direction of the first joint face. Instead of a plurality of openings or slit-shaped openings it is also possible to employ one single continuous slit-shaped opening in the first joint face. As a result of the slit-shaped openings the first and second structural components may be displaced and adjusted linearly with respect to each other parallel to the circular-cylinder axis. Further, the above mentioned version enables the bolt-type connections to be positioned at will in the longitudinal direction of the structural components.

Both of the structural components joined according to the invention may enclose an angle, preferably a right angle. Connecting points on the first and second structural components can accommodate construction elements such as wall and floor elements which are at an angle to each other, preferably a right angle. By specifically arranging and dimensioning the circular-cylinder faces or joint faces the structural components are connected with displacement directions at the joining places forming an angle to each other, preferably a right angle.

In a preferred version of the invention the first structural component is a lower longitudinal wall section, in particular a floor strut and the second structural component a floor connection section. The floor strut features connecting points for attaching wall elements and the floor connecting section features connecting points for attaching floor elements.

In a further version of the invention the first structural component is an upper longitudinal wall section, in particular a roof strut and the second structural component a roof connecting section. The roof strut features connecting points for attaching wall elements and the roof connecting section features connecting points for attaching roof elements.

The floor strut or the roof strut is to advantage made of an extruded single or multi-chamber hollow section, to advantage of aluminium or its alloys. The roof connecting section or floor connecting section is to advantage made of an extruded single or multi-chamber hollow section, to advantage of aluminium or its alloys.

The first structural component or floor or roof strut usefully features a convex joint face. The second structural component or floor or roof connecting section usefully features a concave joint face.

The roof or floor strut as the first structural component usefully features at the remote end an undercut groove for attaching wall elements, in particular wall columns. The floor or roof connecting section as the second structural component usefully features a floor or roof connecting point, preferably in the form of a strut, for attaching a floor plate or roof elements. The floor strut may also exhibit further connecting points, in particular undercut grooves, for attaching cantilever seats.

The floor or roof strut and the floor or roof connecting section in the respective connection may have an overall length of 35 to 45 cm and an overall breadth of 20 to 35 cm. The radius of the circular cylinder may be e.g. 2 to 10 cm, in particular 3 to 7 cm.

The cold connection according to the invention is employed preferably in road or rail bound vehicles. It can also find application in aircraft manufacture, boat-building or ship-building, or in the building industry.

By shaping the joint faces as part of a circular cylinder and thanks to the play available when the connection is loose, it is possible—by tilting the components with respect to each other—to achieve specific relative displacements in different directions and by different amounts at the relevant displacement points on a structural component. As a result it is possible with a connection according to the invention e.g. to broaden the sidewall by a specific amount by relative displacement of the structural components, this without having to adapt or rework the connecting points.

Furthermore, the cold connection according to the invention in the appropriate form also permits the structural components to be displace in a linear manner parallel to the circular-cylinder axis, thus enabling the tolerances at the relevant displacement points to be accommodated in two directions.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the following, the invention is explained in greater detail by way of example and with reference to the drawings attached showing in.

DESCRIPTION OF THE PREFERRED EMBODIMENTS

Figure 1:
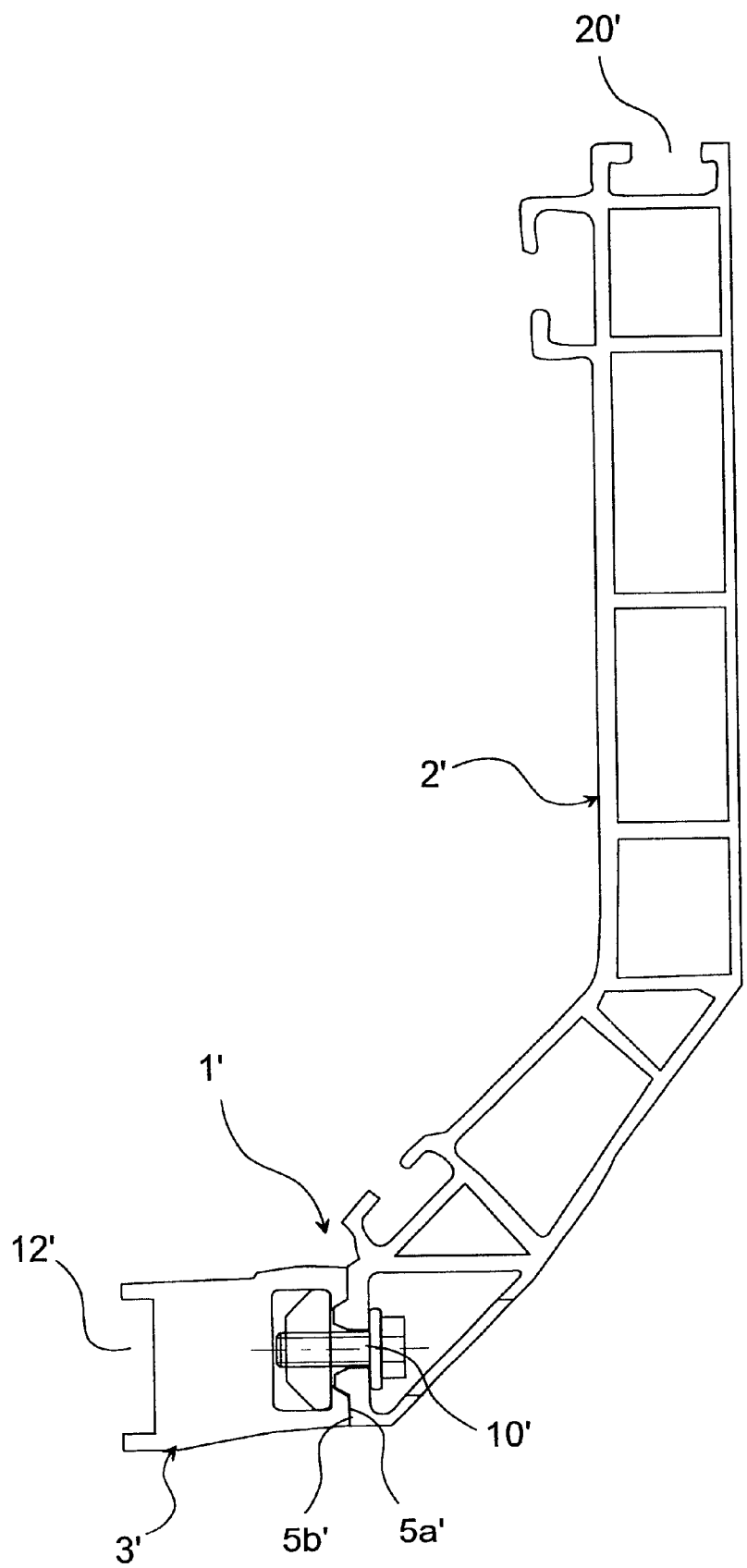
FIG. 1: a cross-section through a floor strut connected to a floor section in the manner according to the state of the art.

FIG. 1 shows a known version of a linear connection 1' between a floor strut 2' as a first structural component having a first connecting face 5a' and a floor section 3' as a second structural component having a second connecting face 5b'. The floor strut 2' is joined to the floor section 3' via bolt connections 10' which penetrate the first and second connecting faces. The described linear connection permits only very narrow tolerances in the structural components 2' and 3'. If there are larger deviations in lateral dimensions of the floor joint 12' or the roof joint 20', then the components 2', 3' have to be reworked at these places 12', 20'.

Figure 2:
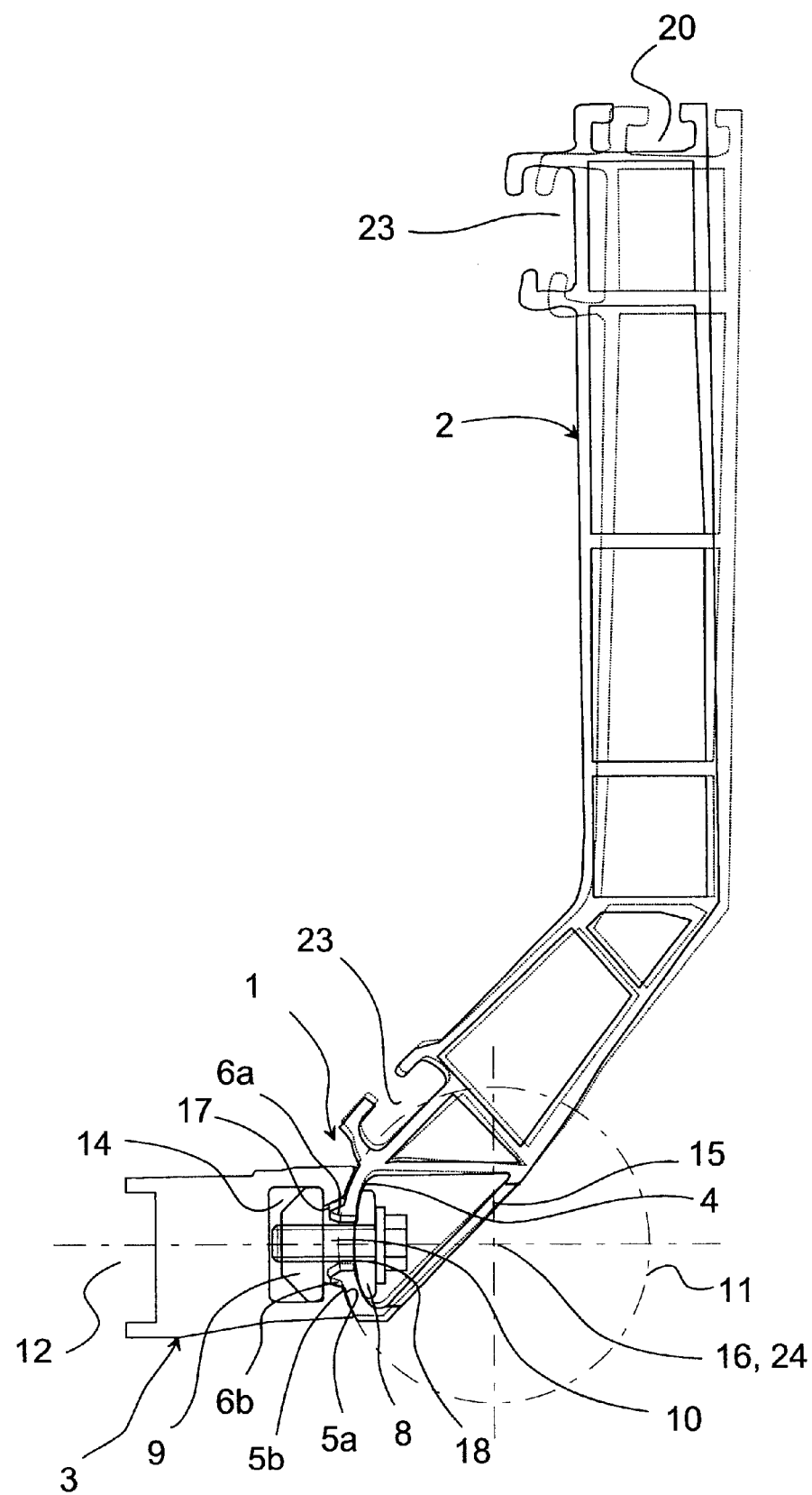
FIG. 2: a cross-section through a floor strut connected to a floor section in the manner according to the invention.

FIG. 2 shows a linear connection 1 according to the present invention between a floor strut 2 as a first structural component and a floor connecting section 3 as a second structural component. The floor strut 2 connected to the floor connecting section 3 has an overall length of about 40 cm and overall width of about 22 cm.

The floor strut 2 contains a first joint face 5a and a contact face 4; the floor connecting section 3 contains a second joint face 5b. The faces 5a, 5b are arranged with respect to each other as a pair and, together with the contact face 4, form an arc of a common circular-cylinder 11 with common axis 16. The radius of the cylinder 11 is about 55 mm.

The second joint face 5b contains a longitudinal groove-shaped opening 17 with an undercut groove 14, both of which run parallel to the axis 16. The floor strut 2 features a slit-shaped opening 18 which penetrates the joint face 5a and runs parallel to the axis 16. Bolts 10 are introduced from the side of the contact face 4 in the floor strut 2. The bolts 10 penetrate the slit-shaped opening 18 and the longitudinal groove-shaped opening 17 through to the undercut longitudinal groove 14 and are screwed into the internal threads in parallelogram-shaped clamping plates 9 situated in the longitudinal groove 14. The bolt 10 clamps the plates 9 against the undercut regions of the groove 14 with the result that the short parallel sides of the clamping plate 9 lie securely against the long sides of the undercut groove 14. In order to provide better anchoring, the sides of the clamping plate 14 facing the longitudinal groove-shaped opening 17 are concave in shape.

The heads 25 of the bolts 10 lie against a washer section 8 which runs parallel to the axis 16 and is made to fit to the curvature of the contact face 4. An opening 15 for assembly purposes in a hollow chamber wall in the floor strut 2 allows the bolts 10 to be introduced from the outside. The bolt-type connection is tightened or loosened by means of a tool introduced through the opening 15.

Figure 3:
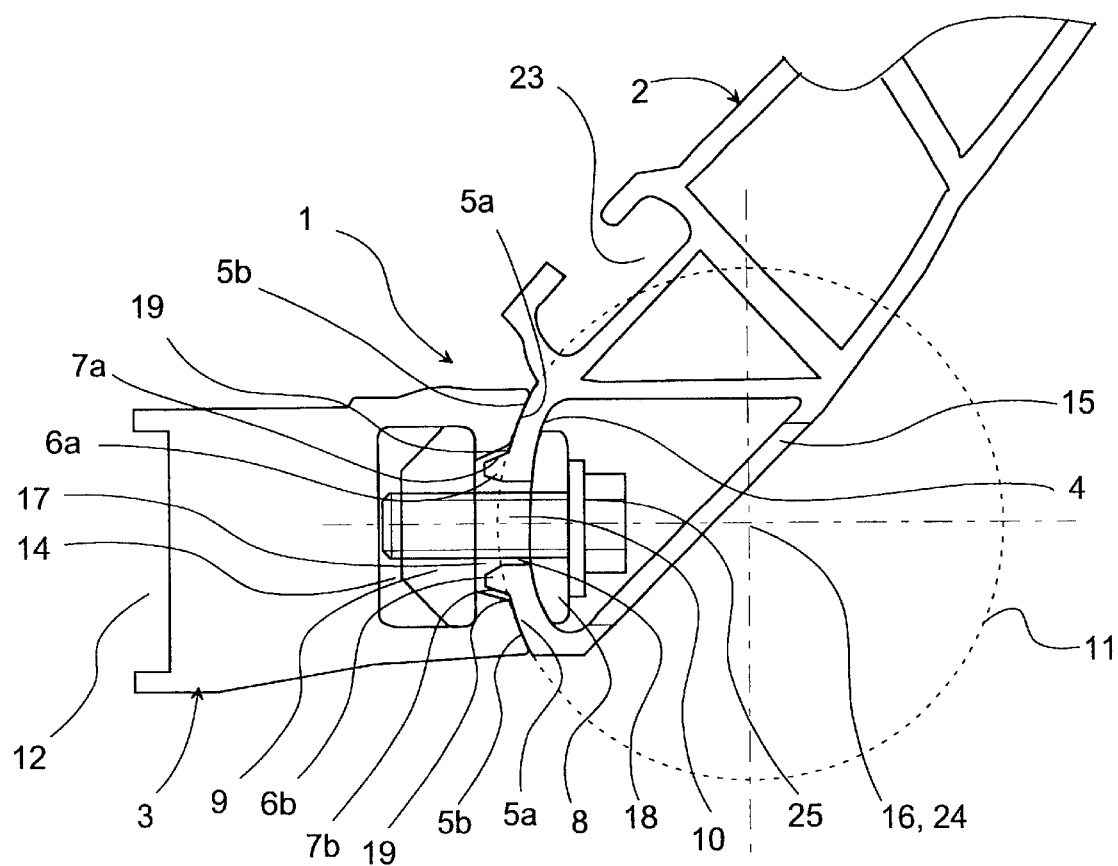
FIG. 3: an enlargement of part of the connection according to the invention between a floor strut and floor section as shown in FIG. 2.

The first joint face 5a of the floor strut 2 features on both sides of the openings 18 projections 6a, 6b which run parallel to the axis 16. The projections 6a, 6b join up via their outer bases 7a, 7b with the curvature of first connecting face 5a (see FIG. 3).

A space in the form of a free length of arc 19 is present between the outer bases 7a, 7b and the facing walls of the longitudinal opening 17. The free length of arc 19 is about 1 mm.

The diameter of the openings 18 transverse to the axis 16 is larger than the diameter of the length of bolt 10 passing through the openings 18—at least by an amount equal to twice the free length of arc 19.

When the connection is loose, the floor strut 2 can be displaced relative to the floor connecting section 3 by sliding the first and second joint faces 5a, 5b from a central position by an amount equal to the free length of arc 19 using a rotating action either clockwise or anti-clockwise until the outer base 7a of the projection 6a lies against the wall it faces in the longitudinal groove 17. The amount of displacement of the connection 1 possible this way is therefore twice the length of the arc 19 i.e. ±1 mm.

At its remote end the floor strut 2 exhibits a connection region 20 in the form of an undercut groove for connecting up to the wall. The above mentioned relative movement of the floor strut 2 at the connection 1 effects a displacement of that connection region 20 amounting to an arc of about ±8 mm. The displacement is essentially horizontal, which corresponds to a broadening or narrowing of the vehicle cross-section by approximately the order of magnitude mentioned.

As the distance between the central point 24 of the circular-cylinder cross-section and the wall connection region 20, as relevant displacement point, is much greater than the distance between the central point 24 of the circular-cylinder cross-section and the connection 1, the distance of displacement of the former is much greater i.e. ±8 mm.

Both positions of maximum displacement of the first structural component 2 are shown in FIG. 2—one such position being shown by dotted lines.

The floor connecting section 3 features a place 12 for connecting up to the floor in the form of a pair of horizontal struts designed to accommodate the floor elements.

The floor strut 2 features further connecting places 23 in the form of undercut grooves to which e.g. seat structures can be attached.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A linear cold connection, comprising: a first structural component having a first joint face; a second structural component having a second joint face parallel to the first joint face, the joint faces being configured to form an arc of a circular cylinder with a common cylinder axis, the first and second structural components being arranged to abut along the parallel first and second joint faces; bolt-type connections arranged to penetrate the joint faces and fix together the first and second components, the first and second joint faces each having at least one opening through which the bolt-type connections pass, the at least one opening of the second joint face being a slit-shaped opening of a longitudinal undercut groove running parallel to the circular cylinder axis; and internally threaded inserts arranged in the undercut groove, the bolt-type connections being screwed into the inserts to tighten the connection by anchoring the inserts in the undercut groove, both structural respective components being shiftable relative and transverse to the cylinder axis when the bolted connection is loose so as to adjust the components before the bolt-type connections are tightened.

2. A linear cold connection according to claim 1, wherein the structural components are longitudinal sections each with a longitudinal axis, the longitudinal axes run parallel to each other, and the joint faces with the common circular-cylinder axis run parallel to the longitudinal axes of the sections.

3. A linear cold connection according to claim 1, wherein at least one of the structural components is an extruded section.

4. A linear cold connection according to claim 3, wherein both structural components are extruded sections having at least one chamber.

5. A linear cold connection according to claim 1, wherein at least one of the structural components is metal.

6. A linear cold connection according to claim 5, wherein at least one of the structural components is made of one of aluminum and aluminum alloy.

7. A linear cold connection according to claim 1, wherein the first structural component is a longitudinal wall section having a floor strut or roof strut and the second structural component is a floor or roof connection section, both structural components being fitted together to join wall elements to floor elements and wall elements to roof elements, whereby wall elements are attached to the floor or roof struts and roof or floor elements are attached to the floor or roof connecting section.

8. A linear cold connection according to claim 1, wherein the openings at least of the first joint face have diameters transverse to the circular-cylinder axis which are greater an a diameter of the bolts penetrating the openings.

9. A linear cold connection according to claim 8, wherein the bolts penetrate the openings and the longitudinal groove-shaped opening in the first and second joint faces and are screwed tightly into the internal threads in the inserts introduced into the grooves so that when the bolt-type connection is loose the first structural component can be displaced linearly relative to the second structural component in a direction given by the circular-cylinder axis.

10. A linear cold connection according to claim 9, wherein the first joint face next to the longitudinal opening has projections running parallel to the circular-cylinder axis and penetrating the longitudinal groove-shaped opening, the projections having outer bases spaced at a distance smaller than a width of the longitudinal groove-shaped opening so that, when the bolt-type connection is loose, the first and second joint faces are slidable relative to each other whereby the first structural component is displaceable by a relative movement in a direction transverse to the axis until the outer bases make contact with a facing wall of the longitudinal opening.

11. A linear cold connection according to claim 10, wherein the projections are situated on both sides of the opening and are formed as first and second bulges with outer bulge bases, the distance between the outer bulge bases being smaller than the width of the longitudinal groove-shaped opening.

12. A linear cold connection according to claim 9, wherein the opening in the first joint face of the first structural component is a slit-shaped opening running in a longitudinal direction of the joint face parallel to the circular-cylinder axis.

13. A linear cold connection according to claim 1, and further comprising a washer element that rests on the contact face and has a side facing the contact face which exhibits a circular-cylinder shaped surface which matches the contact face exactly, the washer element having a hole through which the bolt passes so that the head of the bolt rests on the washer element.

14. A linear cold connection according to claim 13, wherein the washer element is a strip-shaped section that runs parallel to the circular-cylinder axis and features a plurality of holes to accommodate the bolt-type connections.

* * * * *